United States Patent Office 2,976,193
Patented Mar. 21, 1961

2,976,193

PROCESS AND COMPOSITIONS FOR PRODUCING ALUMINUM SURFACE CONVERSION COATINGS

George H. Pimbley, Inglewood, Calif., assignor, by mesne assignments, to Purex Corporation, Ltd., a corporation of California No Drawing. Filed Aug. 3, 1959, Ser. No. 830,988

37 Claims. (Cl. 148—6.21)

This application is a continuation-in-part of my copending applications Serial No. 647,933, filed March 25, 1957, now Patent No. 2,898,250, granted August 4, 1959; Serial No. 710,402, filed January 22, 1958; Serial No. 754,935, filed August 14, 1958, now Patent No. 2,927,874, granted March 8, 1960; and Serial No. 772,677, filed November 10, 1958.

This invention relates to the art of chemically coating aluminum surfaces, and particularly to the production of substantially colorless and corrosion resistant coatings upon such surfaces. Aluminum articles containing such coatings are particularly adapted for exterior usage such as, for example, aluminum house siding. The invention is especially concerned with novel compositions and procedure for producing improved substantially colorless surface coatings on aluminum surfaces. The term "aluminum" as employed herein is intended to denote pure aluminum, commercial grade aluminum containing small amounts of other materials and aluminum alloys, i.e., those in which aluminum predominates.

In the prior art many methods are known of producing chemical films on aluminum surfaces, some of which have been commercially advantageous and have been widely practiced for many years past. Among these are the formation of artificial oxide coatings by means of electric current in chemical baths, the immersion of clean aluminum surfaces in alkaline baths containing oxidizing compounds whereby oxide type coatings are produced, and immersion in acidic baths containing an acid which attacks aluminum, together with other components effective to form a fixed integral film or coating upon the surface, the coating produced by the latter procedure being termed a "conversion coating." It is the latter class of coatings to which the present invention relates. A brief description of this category of chemical coatings on aluminum is given below.

When an object having a surface of aluminum is cleaned free of grease and other surface soil, and is then immersed in or otherwise contacted with a solution containing anions of an acid which attacks aluminum, such as hydrofluoric acid, together with dichromate and hydrogen ions, a chemical reaction occurs which results in a fixed, integral film upon the aluminum surface. The precise nature of this reaction and of the resulting film is not known. Probably some of the aluminum is dissolved, bringing about an increase of pH at the interface between the aluminum surface and bath liquid. The conversion coating that results is probably a gel-like amorphous complex of unknown state of chemical composition and physical structure. Generally, these coatings are thin, smooth, non-crystalline, relatively adherent and flexible, moderately lustrous, and are of yellow color, with more or less red, blue and greenish iridescence. The exact shade of color and degree of lustre differ greatly, according to which alloy of aluminum is being processed and according to the details of the processing procedure.

Chemical conversion coatings of the kind described, and as known in the prior art, have been found sufficiently advantageous to warrant increasing use by airplane manufacturers and other industrial fabricators of aluminum as well as for building purposes. The procedures for application of such coatings have certain attractive features, including simplicity, low processing temperatures, brief contact time and feasibility of spray application.

The conversion coating formulations of the prior art generally involve the use of an acidic bath containing ions of dichromate and fluorine, and sometimes containing phosphate or arsenate ions. In my Patent No. 2,868,679, I have disclosed an improved conversion coating process and composition for obtaining colored coatings of improved corrosion resistance and having other advantages, said composition being in the form of an aqueous acid solution containing as essential active ingredients a cation of the group II–A elements, such as beryllium, magnesium, calcium, strontium or barium, or lithium, and an anion which attacks aluminum, e.g., fluorine. Such composition also preferably includes an anion containing hexavalent chromium, molybdenum or tungsten, or mixtures thereof.

In my above noted copending application Serial No. 710,402, I have described production of improved conversion coatings on aluminum by treatment of the aluminum body in a composition in the form of an aqueous solution containing as essential ingredients a cation of the group II–B elements, namely, zinc, cadmium or mercury, and an anion which attacks aluminum, e.g., a halogen-containing anion such as fluorine. The solution preferably also contains hexavalent chromium. When operating this solution at a pH range between about 1.3 and about 2.2, a colored conversion coating is obtained, and when operating the solution at a pH range of about 2.3 to about 2.7, a substantially colorless conversion coating is produced.

In my above noted copending application Serial No. 772,677, is described production of improved colored or colorless aluminum conversion coatings employing as essential active ingredients cations of one or more of the group of elements 23 to 29 of the periodic table, namely, vanadium, chromium, manganese, iron, cobalt, nickel or copper, and a halogen-containing anion. Preferably a hexavalent chromium, molybdenum or tungsten-containing anion or a ferricyanide anion is included. At a pH of about 1.6 to about 2.2, a colored conversion coating is obtained, and at a pH of about 2.5 to about 3.5 a colorless conversion coating results.

My above copending applications Serial Nos. 647,933 and 754,935 are concerned with production of colorless aluminum conversion coatings. In Serial No. 647,933 the aluminum article is treated with solutions containing certain compounds containing a carbon-nitrogen linkage, e.g., a thiocyanate or thiourea, to produce colorless conversion coatings. These decolorizing agents can be incorporated in the conversion coating bath itself or employed for after-treatment of a previously formed colored conversion coating.

In Serial No. 754,935 a colored conversion coating is treated with an aqueous solution of certain color discharge agents including, for example, soluble sulfur-containing compounds, phosphorus-containing compounds, ferrocyanides, and organic compounds such as hydrazines.

In many instances it is desirable to produce a colorless or almost colorless conversion coating without impairing the other properties of the coating, for example, its corrosion resistance, smear-proofness and uniformity, and while desirably improving such properties, particularly corrosion resistance.

When the decolorizing agents of my above applications 647,933 or 754,935 are employed for producing colorless conversion coatings from a colored coating formed by treatment with a solution containing the group II-A cations of my above patent, the greater thickness of the colored coating produced requires relatively vigorous treatment by the decolorizing agents in order to render the coating colorless, and such treatment tends toward impairing the corrosion resistance of the final colorless coating.

The colored or substantially colorless coatings produced employing the group II-B cations of Serial No. 710,402, or employing cations of the elements 23 to 29 according to Serial No. 772,677, are thinner than the colored conversion coatings produced employing the group II-A cations of my above patent. Further, solutions containing the cations of these applications 710,402 or 772,677 produce colored conversion coatings of reduced color intensity for equal salt spray (corrosion) resistance as compared with colored conversion coatings produced by treatment in the solutions containing the group II-A elements, e.g., magnesium or calcium, of my above patent. Moreover, when the group II-B cations or the cations of the elements 23 to 29 are employed under pH conditions for producing colorless conversion coatings, in some instances there often remains in the coating a certain amount of undesirable coloration.

One object of the invention is to produce substantially colorless coatings or films on aluminum surfaces.

Another object is the provision of aluminum conversion coatings of the aforementioned type having good corrosion resistance.

Yet another object is to provide composition and procedure for removing practically all of the color from aluminum conversion coatings without detrimental effect on corrosion resistance of the coating, or while at the same time enhancing corrosion resistance.

Still another object is to afford process and compositions for forming a conversion coating on aluminum, and removing the color from said coatings, and increasing corrosion resistance.

A still further object is the provision of compositions and procedure for simple, rapid and inexpensive treatment of aluminum for production of corrosion resistant, tenacious aluminum conversion coatings which are substantially free of color.

Other objects and advantages of the invention will be apparent from the following description of my invention.

I have now found that by treatment of an aluminum article having a colored conversion coating formed by employing a solution of the group II-B cations or of the cations of the elements 23 to 29, described in my above copending applications 710,402 and 772,677, with a decolorizing or color discharge agent of the types described in my above copending applications Serial Nos. 647,933 and 754,935, I can produce an unusually high quality, relatively tenacious, wear resistant colorless coating having enhanced corrosion resistance, on all of the commercial alloys of aluminum. By the term "colorless" or "substantially colorless" coatings, I mean to include coatings having a very pale or barely perceptible coloration as well as coatings which appear colorless.

Thus, according to the invention, colorless corrosion resistant conversion coatings can be obtained conveniently and in a single step during the initial formation of the conversion coating in the acidic conversion coating bath itself, or if desired, by a simple alternative procedure involving after-treatment preferably of the freshly formed conversion coating, with improved results obtained, particularly as regards good or enhanced corrosion resistance of the final coating.

It has been found that, due to the generally lower color intensity of the colored conversion coating formed employing the group II-B cations or the cations of the elements 23 to 29, as compared to the color intensity of the conversion coatings formed employing the group II-A cations of my above patent, a less vigorous action of the above noted decolorizing agents is required to achieve efficient removal of color than in the case of the group II-A cations. Hence there is considerably less impairment of the corrosion resistance of the resulting decolorized coating than is the case where the colored conversion coating is formed initially employing said group II-A cations. Further, the resulting colorless conversion coating according to the invention is unexpectedly more corrosion resistant and more free of any coloration than in the case where the colorless coatings are formed employing the group II-B cations or the cations of elements 23 to 29 by suitable adjustment of the pH, as above noted, and in the absence of any decolorizing agent. Hence, according to the invention, employing certain decolorizing agents, colorless conversion coatings of high corrosion resistance are made possible from conversion coatings produced employing said group II-B cations or the cations of the elements 23 to 29.

In producing conversion coating compositions suitable for use according to the invention, the group II-B cations, that is, zinc, cadmium and mercury, or the cations derived from the elements 23 to 29, including vanadium, chromium, manganese, iron, nickel, cobalt and copper, may be introduced into the solution by means of commonly available products, such as, for example, the oxides, hydroxides, halides and nitrates of such cations. In cases of some of the more difficultly soluble of these compounds, it is convenient to facilitate solution by simultaneous addition to the bath of a suitable amount of nitric acid.

Generally I have found that the amount of the elements, or group II-B cations or cations 23 to 29, employed should be equivalent to about 0.2 to about 8.0 grams of the element per liter of processing solution, depending upon the particular element employed.

The solutions of the invention preferably also should contain an anion containing hexavalent chromium. Such anion appears to function in conjunction with the above mentioned group II-B cations or cations derived from the group 23 to 29 elements, as well as with the other ions in the solution, to confer greater corrosion resistance on the resulting coating, and also is believed to caused a yellow coloration of the coating. When anions containing hexavalent chromium are present in the solution, the source material for said chromium may be a material such as chromium trioxide or a chromate or dichromate such as the sodium or potassium chromate or dichromate.

However, particularly when the cations of elements 23 to 29 are employed, the hexavalent chromium-containing anion may be partially or wholly replaced by a molybdenum or tungsten-containing anion, e.g., the molybdate or tungstate anion, although ordinarily I prefer the hexavalent chromium type. I have also found that the hexavalent chromium-containing anion may be replaced, wholly or in part, by ferricyanide anion. The ferricyanide ion may be introduced, for example, by employing ferricyanides of ammonium, potassium or sodium. The molybdenum and tungsten-containing anions and ferricyanide anions will be termed equivalent anions of the hexavalent chromium-containing anion. These anions may be employed singly or in combination.

Preferably the treating solutions of the invention also contain an anion which effectively attacks or corrodes aluminum such as halogen-containing anions, i.e., an anion containing fluorine, chlorine, bromine or iodine. The simple halogen anions can be employed or complex anions containing a halogen. The complex halogen-containing anions which are suitable are those forming free halogen ions in equilibrium with the complex anion under the acid conditions employed herein, so that the solution contains some free halogen ion together with such complex anion. The preferred anion is the fluorine-containing ion either as a simple fluorine anion or in the form of a complex, as this type is the most effective and convenient. The anions of chlorine, bromine and iodine are also effective and useful for the attack on the aluminum surface, but in a lesser degree and by the use of higher processing temperatures and longer periods of contact. The latter anions are usually employed as the simple chlorine, bromine or iodine anions.

Considerable latitude is provided as to the range of concentration of hexavalent chrominum compound or equivalent material employed. I have found that a suitable working concentration of hexavalent chromium, molybdenum or tungsten-containing anion or ferricyanide anion for the purpose of the invention is produced by employing an amount of such material equivalent to between about 0.3 and about 9.0 grams of the element chromium, molybdenum or tungsten, or of the ferricyanide ion per liter of processing solution.

Concerning the amounts of source material for the aluminum attacking, e.g., simple or complex fluorine-containing ions preferably used along with the hexavalent chromium-containing or equivalent anion in the bath, I have experienced highly satisfactory results with solutions in which the weight ratio of hexavalent chromium, molybdenum or tungsten present in their respectve anions, or of ferricyanide anion:fluorine present in the fluorine-containing anion has an overall range between about 0.7:1 and about 3.5:1. In the case of hexavalent chromium, the preferred range is about 0.7:1 to about 2.5:1.

The immediately foregoing range of ratios permits use of a variety of source materials for fluorine-containing ions. Many fluorine compounds can be successfully used as the source of said ions, including HF, NaF, $NH_4HF_2$, $HBF_4$, $NaBF_4$, $NH_4BF_4$, $ZnSiF_6$, and $Na_2SiF_6$. These compounds vary in ionization characteristics, and hence, they are used in varying proportions, depending upon the particular compound selected. The complex ions, e.g., the $BF_4$ and $SiF_6$ ions produced by the corresponding compounds, are believed to dissociate to form free fluorine anions, and hence such free fluorine anions are present and in equilibrium with the complex anions. I have found that the simple fluorides, such as NaF, should be present in such proportion that the ratio of hexavalent chromium, molybdenum, tungsten or ferricyanide of their respective anions:fluorine approaches the 3.5 end of the above range. The more complex fluorine compounds, such as $NaBF_4$, may be satisfactorily used in larger quantities, so that the aforementioned ratio approaches the 0.7 limit of the above range.

I may also employ as the source of fluorine-containing ion double metal fluorides, such as potassium titanium fluoride and sodium zirconium fluoride.

When it is desired to employ aluminum-attacking substances other than those containing fluorine, the same general considerations obtain as to the proportions between such substances and the hexavalent chromium-containing or equivalent anions. Thus, for example, when chlorine-containing substances are used, the range of the weight ratio Cr(VI):Cl may be about the same as for fluorine, i.e., about 0.7:1 to about 2.5:1. Because of the higher atomic weights of bromine and iodine, and the more sluggish action in processing baths of this invention, as compared with fluorine, it is feasible to use larger amounts of Br and I, so that, for example, the value of the weight ratio Cr(VI):Br or I will be smaller. Thus, a suitable range for Cr(VI):Br is about 0.5:1 to about 1.7:1, and a suitable range for Cr(VI):I is about 0.3:1 to about 1.4:1.

It is to be understood that the proportions and ranges given above are not critical and that results nearly as satisfactory may be obtained outside these limits, but they are the proportions and ranges I prefer.

The conversion coating initially formed possesses its predominant coloration, e.g., yellow color, due, it is believed, to retention of a chromophor, e.g., in the form of yellow hexavalent chromium compound, in the film following the conversion coating operation where such operation takes place in the presence of hexavalent chromium ion. I have found that the above described color discharge agents apparently have the ability to penetrate the conversion film and to react chemically with the coloring body present, such as the yellow hexavalent chromium, to discharge the chromophor and form substantially colorless products. Thus, no color or effect of color in the treating solution containing the color discharge agent is noticeable or perceptible, indicating a true chemical reaction between my color discharge agent and the chromophoric body in the conversion film. The color discharge agents employed in the invention for this purpose are those which on formation of a 2% solution of the agent and immersion therein of a colored conversion coating at a treatment temperature of 120° F. for a period not more than 15 minutes, produces a visible discoloration, or removal of color, from the conversion coating. The color discharge agents utilized in the invention are also preferably free of any tendency to form insoluble colored compounds with hexavalent chromium.

The above theory of operation of the color discharge agents applies particularly where a colored coating is produced first in the conversion coating bath and the color discharge agent is employed in a separate after treatment solution. The color discharge agent is also believed to function in a similar manner where it is present in the conversion coating bath itself, although applicant has no present data to substantiate this.

The carbon-nitrogen agents of my copending application Serial No. 647,933, or the color discharge agents of my copending application Serial No. 754,935 come within the aforementioned definition and function, and can be incorporated in the conversion coating bath.

The carbon-nitrogen compounds suitable for use in the invention are soluble compounds containing unsaturated tetravalent carbon linked to nitrogen and to either oxygen or sulfur. These compounds may be acyclic or heterocyclic. Preferably, I employ compounds which contain the linkages noted below, where X is oxygen or sulfur:

(1)

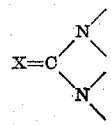

Examples of compounds having the above linkages represented by Formula 1 are urea, thiourea, cyanuric acid and thiocyanuric acid.

(2)                    $-X-C\equiv N$

Examples of compounds having linkages represented by Formula 2 are the cyanates and thiocyanates.

Thus, for example, I can employ alkali metal or other soluble metallic cyanates and thiocyanates including chromic thiocyanate, and ammonium and alkali metal thiocyanates and cyanates, e.g., CNSK, CNSNa, CNOK and CNONa. I may also utilize soluble cyanate and thiocyanate esters such as, for example, isobutyl thiocyanate. Hence the terms "cyanates" and "thiocyanates" employed herein are intended to include the soluble salts and esters thereof. Of this class of materials, the preferred agents are thiourea and thiocyanates.

Other color discharge agents which can be employed in the conversion coating bath, either as an alternative to or together with the above carbon-nitrogen agents, include soluble sulfur-containing compounds, soluble phosphorous-containing compounds, soluble ferrocyanides, soluble divalent and trivalent chromium compounds, hydroquinone, quinhydrone, and hydrazine compounds. Illustrative specific examples of the groups of compounds noted immediately above are ammonium and alkali metal thiosulphates and sulphites, ammonium and alkali metal phosphites and hypophosphites, phosphorous acid, ammonium and alkali metal ferrocyanides, chromous oxalate, chromic nitrate, hydrazine hydrate, hydrazine sulfate and other soluble hydrazine salts, and the like. Other groups of compounds which may be useful for the process of this invention but which are less preferred include soluble ferrous compounds such as ferrous sulphate, and ammonium and alkali metal hypochlorites. Preferred specific color discharge agents of these classes are potassium ferrocyanide, sodium hypophosphite, sodium thiosulphate, hydroquinone, chromic nitrate, hydrazine sulphate, and phosphorus acid.

The baths of the invention may contain from about 0.1 to 5.0 grams per liter, preferably about 1.0 to 5.0 grams per liter, of the above carbon-nitrogen agents, such as urea, thiourea, or thiocyanate, or of the aforementioned other color discharge agents such as hydrazine sulfate, potassium ferrocyanide or hydroquione.

Because of the limited solubility of cyanuric acid and thiocyanuric acid, they are best used at somewhere near the low proportion of the range mentioned above, for example, in the case of cyanuric acid around 0.7 gram per liter. Otherwise insoluble material will form, which is inconvenient and an economic waste. I have found that cyanuric acid is quite effective at about 0.5 to 1, preferably about 0.7 gram per liter.

The various materials that make up the conversion coating baths of the examples below may be added separately to water to form the solution or bath, or the dry ingredients may be simply mixed and sold as a dry mixed product for incorporation in water just prior to use. In the latter case, the dry product should contain from about 5% to about 25% of the above described color discharge agents, with a preferred range of about 10% to 20%. The dry mixed product should be added to water to form the bath in an amount of about 0.1 ounce to 5 ounces per gallon of water, with a preferred range of about 1½ to 3 ounces per gallon.

The pH of the conversion coating bath may range from about 1.5 to about 3.5. However, for best results I prefer a range of about 2.2 to about 2.8. If the pH is too low, the coating will not be colorless; if too high, the corrosion resistance of the coating will not be adequate. In some cases solutions made up according to this application, and illustrated by the examples below, will have an initial pH a little higher than the preferred range indicated above. The pH may be brought within the preferred range by minor additions of acids or acidic substances, such as $H_2SO_4$ or nitric acid, preferably nitric acid. Such adjustment will ordinarily require not more than about 0.1% by volume of nitric acid of specific gravity 1.42, based on the volume of the bath.

In preferred practice of the invention, the aluminum surfaces of the part preferably are first cleaned free of grease and soils by conventional methods, using cleaning agents known to be effective and safe on aluminum. Cleaning residues are removed by rinsing with water, usually hot water.

If the aluminum part has an obstructive oxide coating, the surface coating is next deoxidized. This is a step in the process that may or may not be employed, depending upon the particular alloy and stock of aluminum being processed. Certain alloys, such as 61-S, usually bear a surface skin of oxide, of such a nature that it is resistant to the formation of the conversion film. In such cases the oxide film must be removed, after the cleaning operation, and before contact with the conversion coating solution or bath. This oxide film removal can be accomplished by various solutions usually containing a large proportion of compound having the $SO_4$ radical, a moderate proportion of hexavalent chromium compound, and a small proportion of a fluorine compound. For aluminum alloys having considerable proportions of silicon, it is beneficial to include nitric acid in the deoxidizing treatment, either as an ingredient of the deoxidizing bath or of a separate bath employed in conjunction with the former. A deoxidizing solution which may be used is as follows:

| | Grams |
|---|---|
| Sodium bisulphate | 57.5 |
| Ammonium bifluoride | 1.0 |
| Potassium dichromate | 16.5 |

Water to make one liter.

The surfaces of the aluminum articles are immersed in or otherwise contacted with the above solution for say five to eight minutes, at temperatures in the approximate range of 75°–90° F. The surfaces are then thoroughly rinsed with cold water.

The work surfaces are then immersed in or otherwise contacted with the conversion coating solution or bath. The temperature of the bath may range from about 75° to 110° F., the preferred temperature range being about 80°–90° F. for dipping, and about 90°–100° F. for spray application. Depending upon the bath temperature, the time period of contact may range, for example, from 30 seconds to 10 minutes; the preferred ranges are 2 to 5 minutes for dipping, and 1 to 2 minutes for spraying.

After removal from the conversion coating bath the work may be simply rinsed in cold or warm water and dried in air at room temperature or by means of warm air, preferably not above 175° F.

Practice of my invention is illustrated by the following examples:

*Example 1*

A processing bath was prepared with the following ingredients and proportions:

| | Grams |
|---|---|
| Chromium trioxide, $CrO_3$ | 2.18 |
| Potassium dichromate, $K_2Cr_2O_7$ | 2.81 |
| Zinc silico fluoride, $ZnSiF_6 \cdot 6H_2O$ | 2.70 |
| Sodium silico fluoride, $Na_2SiF_6$ | 1.40 |
| Boric acid, $H_3BO_4$ | 1.04 |
| Urea, crystals | 1.12 |

Water to make 1 liter.

The bath prepared as above was allowed to stand overnight and was observed to be an essentially complete solution, with pH of 3.2. The pH was adjusted to 2.5 by addition of approximately 1.2 milliliters of nitric acid (specific gravity 1.42) to the 1 liter bath.

Aluminum parts composed respectively of 3003, 2024–Bare and 6061 alloys were first precleaned to remove grease and soil, and were then dipped into the processing bath described above. Temperature of bath was maintained at 84° F.; immersion time was for 4 minutes. After being removed from the bath, the parts were thoroughly rinsed in cold water, dried in warm air, inspected and then exposed to conventional salt spray cabinet test.

Substantially colorless, uniform conversion coatings of very good appearance were obtained on all of the above alloys by the bath and processing conditions above described. The corrosion resistance of the resulting coatings on 2024–Bare and 6061 alloys was excellent, the salt spray rating being 90% after 312 hours exposure. The salt spray results on 3003 alloy were less satisfactory, being 90% at 144 hours, but are believed acceptable for this particular alloy.

Similar tests with the same bath and conditions were performed with 2024–Bare and 6061 alloys, except that after precleaning and before conversion coating, the test pieces were deoxidized in an aqueous acidic bath containing the sulphate radical, hexavalent chromium and a fluoride. Again, essentially colorless films were obtained, of good, uniform appearance and luster. The salt spray ratings for these latter tests pieces was somewhat better than those where no deoxidizing was performed, being 90% at 360 hours.

The salt spray rating represents an estimate of the percent of the test area directly exposed to the salt mist which is found to have been unaffected at the time of inspection.

Example 2

A formulation consisting of the ingredients listed below was prepared.

| | Percent by weight |
|---|---|
| $ZnSiF_6 \cdot 6H_2O$ | 48.2 |
| $CrO_3$ | 40.0 |
| Boric acid (powder) | 11.8 |
| Total | 100.0 |

The above mixture, when kept in closed glass containers remains as a dry, yellow-tan colored, free-flowing powder, the chromium trioxide appearing as small pieces of dark red-brown color.

A processing bath was prepared by adding the above formulation to water in an amount of 1½ ounces per gallon of solution. The pH of the bath was adjusted to 2.5 by addition of ammonium hydroxide. Panels of 2024 and 3003 aluminum alloys treated in this solution produced colorless films. Salt spray exposure tests of the colorless conversion coatings showed good results with respect to corrosion resistance after 240 hours.

It is seen that, comparing the results of Examples 1 and 2 above, the colorless coating produced by the procedure of Example 1 according to the invention, employing a color discharge agent, withstood salt spray for a longer time, indicating greater corrosion resistance.

Example 3

A processing bath was prepared with the following ingredients and proportions:

| | Grams |
|---|---|
| Chromium trioxide, $CrO_3$ | 4.4 |
| Zinc silicofluoride, $ZnSiF_6 \cdot 6H_2O$ | 5.4 |
| Boric acid, $H_3BO_4$ | 1.5 |
| Potassium thiocyanate, KCNS | 3.7 |
| Water to make 1 liter. | |

The bath prepared as above was essentially free of insoluble matter; its pH was 2.8.

Aluminum parts composed of 2024-Bare and 6061 alloys were precleaned, deoxidized, and then immersed in this conversion bath for 4 minutes, at temperature of 83° F. The conversion coatings thus produced on both of the alloys were essentially colorless and were of good uniformity and luster. Salt spray ratings were estimated to be 88% at 288 hours test for the 2024-Bare, and 90% at 384 hours for the 6061 alloy.

Example 4

A processing bath was prepared with the following ingredients and proportions:

| | Grams |
|---|---|
| Chromium trioxide, $CrO_3$ | 4.4 |
| Zinc silicofluoride, $ZnSiF_6 \cdot 6H_2O$ | 5.4 |
| Boric acid, $H_3BO_4$ | 1.5 |
| Mercuric chloride, $HgCl_2$ | 1.0 |
| Urea, crystals | 3.0 |
| Water to make 1 liter. | |

The bath prepared as above was essentially free of insoluble matter and the pH was 1.8. The pH was adjusted to 2.7 by addition of approximately 1 milliliter of ammonium hydroxide (specific gravity 0.90) to the 1 liter bath.

A test panel of 2024-Bare aluminum was precleaned and then immersed in the above bath for 4 minutes at 82° F. The conversion film thus produced was colorless, bright and uniform. When subjected to salt spray test, the estimated rating was 90% at 192 hours.

Another test panel of 6061 alloy was precleaned and deoxidized and then immersed in the bath for 4 minutes at temperature of 82° F. The resulting conversion film was bright, uniform and colorless, and was assigned a salt spray rating of 89% at 264 hours.

Example 5

A processing bath was prepared as follows:

| | Grams |
|---|---|
| Mercuric bromide, $HgBr_2$ | 5.3 |
| Chromium trioxide, $CrO_3$ | 8.0 |
| Sodium fluoride, NaF | 4.0 |
| Urea, crystals | 4.5 |
| Water to make 1 liter. | |

A complete solution resulted from the mixture of above ingredients. pH of the bath was 2.6.

Test panels of 3003 and 2024-Bare aluminum alloys, precleaned but not deoxidized, were immersed in the bath for 4 minutes at temperature of 83° F.

The coating produced on the 3003 alloy was substantially colorless, with only semi-luster. However, it was practically unaffected by the salt spray mist, being assigned a rating of 97% after 384 hours.

The coating on the 2024-Bare alloy was practically colorless, with a very faint purple iridescence. This film had good luster and attained a salt spray rating of 88% at 288 hours.

Example 6

A dry composition was prepared by mixing the following ingredients in the proportions stated.

| | Percent by weight |
|---|---|
| Nickelous fluoride, technical, $NiF_2 \cdot 4H_2O$ | 47.0 |
| Chromium trioxide, $CrO_3$ | 23.5 |
| Boric acid, $H_3BO_4$ | 9.5 |
| Urea, crystals | 20.0 |
| | 100.0 |

A brown colored, granular, free flowing dry mixture resulted.

A processing bath was prepared by dissolving 17 grams of this dry mixture in sufficient water to make 1 liter. This concentration is equivalent to 2¼ oz. per gallon. An essentially complete solution resulted, with pH of 2.8. No pH adjustment was made.

Pieces of 3003, 2024-Bare and 7075-Bare aluminum alloys precleaned but not deoxidized, were immersed in this bath for 5 minutes at temperature of 82° F. Colorless, uniform conversion films of good luster were produced on all of the three alloys. These conversion films imparted excellent corrosion resistance to the surfaces. A salt spray rating of 90% was assigned to the 3003 test piece after 264 hours exposure; the 2024 test piece rated 92% at 360 hours; and the 7075-Bare test piece rated 94% at 360 hours.

Example 7

A dry mixture was prepared, having the following ingredients in the proportions indicated. The mixture was in powder form, free flowing, and was suitable for packaging and shipping.

| | Percent by weight |
|---|---|
| Nickel fluoride, $NiF_2 \cdot H_2O$ | 59.0 |
| Chromium trioxide, $CrO_3$, powdered | 29.5 |
| Boric acid, $H_3BO_3$, powdered | 11.5 |
| | 100.0 |

A processing solution was prepared by dissolving the above mixture in water at concentration of 2¼ ounces per gallon water. Sufficient nitric acid (sp. gr. 1.42) was added to the solution to bring it to pH 3.0, about 2.5 grams nitric acid per liter being used. A clear yellow solution resulted.

Panels of 2024 aluminum alloy sheet were treated in the above solution for 6 minutes at temperature of 82° F. and pH 3.0. A colorless conversion film was produced which was bright and had a faint red iridescence, barely visible. There was no tendency to smear or rub off.

The coating had good corrosion resistance, as tested by salt spray exposure for period of 336 hours.

A comparison of Examples 6 and 7 shows greater resistance to corrosion of the colorless coating on the 2024 aluminum alloy of Example 6, produced according to the invention principles, than the coating on the 2024 aluminum alloy of Example 7.

Example 8

A processing bath was prepared as follows:

| | Grams |
|---|---|
| Cobaltous nitrate, $Co(NO_3)_2 \cdot 6H_2O$ | 8.00 |
| Chromium trioxide, $CrO_3$ | 1.45 |
| Hydrofluoric acid, 48% aqueous solution | 0.80 |
| Thiourea | 2.55 |

Water to make 1 liter.

An essentially complete solution resulted, with pH 2.0. Approximately 0.6 ml. ammonium hydroxide was added, to adjust pH to 2.6.

Test pieces of aluminum alloys 2024-Bare and 7075-Bare were precleaned and then immersed in the above bath for 10 minutes at temperature of 80° F. Conversion films were produced on both alloys which were bright, uniform, and essentially colorless. When subjected to salt spray test these test pieces attained ratings of 93% at 336 hours for the 2024-Bare alloy, and 95% at 336 hours for the 7075-Bare, thus exhibiting superior degree of corrosion resistance.

A panel of 6061 aluminum alloy was precleaned, deoxidized, and then immersed in the bath for 5 minutes at 80° F. A colorless, bright, uniform conversion coating was produced, which was given a rating of 95% after 336 hours in the salt spray cabinet.

Example 9

A dry composition was prepared by mixing the following ingredients in the proportions stated.

| | Percent by weight |
|---|---|
| Chromium trioxide, $CrO_3$ | 31.2 |
| Zinc silicofluoride, $ZnSiF_6 \cdot 6H_2O$ | 38.4 |
| Boric acid, $H_3BO_4$ | 10.4 |
| Urea, crystals | 20.0 |
| | 100.0 |

A brown colored, granular, free flowing dry mixture was obtained. A processing bath was prepared by dissolving 17 grams of the above dry mixture in sufficient water to make 1 liter. An essentially complete solution resulted, with pH of 1.8. Approximately 1.2 milliliters of ammonium hydroxide (specific gravity 0.9) was added, to adjust pH to 2.5.

Test pieces of aluminum alloys 2024-Bare and 6061 were precleaned, deoxidized, and immersed in the above bath for 5 minutes at 80° F. Essentially colorless, bright, uniform conversion coatings were obtained, which attained salt spray ratings of 90% at 288 hours for the 2024-Bare alloy, and 90% at 312 hours for the 6061.

Example 10

A processing bath was prepared as follows:

| | Grams |
|---|---|
| Potassium ferricyanide, $K_3Fe(CN)_6$ | 8.0 |
| Chromic nitrate $Cr(NO_3)_3 \cdot 9H_2O$ | 2.5 |
| Potassium fluotitanate, $K_2TiF_6$ | 4.0 |
| Potassium iodate, $KIO_3$ | 3.3 |
| Potassium cyanate, $KCNO$ | 2.7 |

Water to make 1 liter.

An essentially complete solution was obtained with pH 3.5, with no adjustment.

Aluminum pieces of alloys 2024-Bare and 6061 were precleaned, deoxidized, and immersed in the bath for 10 minutes at temperature of 125° F. The conversion films obtained were bright, uniform and essentially colorless, with faint green iridescence. Salt spray test ratings were 90% at 192 hours for the 2024-Bare alloy, and 95% at 336 hours for the 6061.

Example 11

A solution was prepared by dissolving in water the following ingredients, in the amounts indicated, in grams per liter of solution:

| | Grams |
|---|---|
| Chromic nitrate, $Cr(NO_3)_3 \cdot 9H_2O$ | 8.0 |
| Potassium fluotitanate, $K_2TiF_6$ | 4.0 |
| Potassium ferricyanide, $K_3Fe(CN)_6$ | 4.0 |

The above solution initially had a pH of 3.0, but after standing overnight the pH droped to 2.7. 2024 aluminum alloy panels were then processed in the solution by immersion for 5 minutes at 80° F. The surfaces acquired conversion coatings of pale pastel green color with semi-lustre and moderate iridescence, quite uniform and of good apearance. There were no smearing or rub-off tendencies. Corrosion resistance was moderately good, as determined by salt spray exposure for a period of 168 hours, about 90% of the coated surface area estimated as remaining intact.

A comparison of Examples 10 and 11 for 2024 alloy shows a greater salt spray resistance for the colorless coating obtained according to the invention principles in Example 10, compared to the coating processed according to Example 11.

Example 12

A processing bath was prepared by dissolving in water the following ingredients, in the proportions stated, to make a 1 liter solution. The nitric acid was first added to 900 ml. of the water, followed by all of the solids except the urea. The mixture was stirred and gently warmed until it was an essentially complete solution, after which the urea was added, together with sufficient water to make 1 liter.

| | Grams |
|---|---|
| Cadmium oxide, $CdO$ | 3.0 |
| Chromium trioxide, $CrO_3$ | 3.4 |
| Sodium silicofluoride, $Na_2SiF_6$ | 2.8 |
| Boric acid, $H_3BO_4$ | 1.5 |
| Urea, crystals | 2.7 |
| Nitric acid (specific gravity 1.42) | 2.1 |

Water, to make 1 liter.

Aluminum pieces of alloys 2024-Bare and 7075-Bare were precleaned, but not deoxidized, and immersed in the bath for 5 minutes at 80° F. Bright, uniform, essentially colorless conversion films were produced on both alloys. Salt spray ratings were, 90% at 240 hours for the 2024-Bare alloy, and 90% at 288 hours for the 7075-Bare alloy.

Example 13

A processing bath was prepared as follows:

| | Grams |
|---|---|
| Cobaltous silicofluoride, $CoSiF_6 \cdot 6H_2O$ | 8.0 |
| Chromic nitrate, $Cr(NO_3)_3 \cdot 9H_2O$ | 5.0 |
| Sodium molybdate, $NaMoO_4$ | 10.0 |
| Cyanuric acid | 0.7 |
| Nitric acid (specific gravity 1.42) | 5.0 |

Water to make 1 liter.

An essentially complete solution was obtained having pH 3.5, which was not adjusted.

Aluminum pieces of alloys 2024-Bare and 6061 were precleaned and deoxidized, then immersed in the bath for 5 minutes at 90° F. Conversion films were obtained that were uniform, bright, and essentially colorless. The corrosion resistance of these coatings was not as good as the coatings of Example 8, although satisfactory.

The following are further illustrative examples of aluminum conversion coating solutions, according to the invention:

Example 14

| | Grams |
|---|---|
| Chromium trioxide, $CrO_3$ | 2.18 |
| Potassium dichromate, $K_2CR_2O_7$ | 2.81 |
| Zinc silico fluoride, $ZnSiF_6 \cdot 6H_2O$ | 2.70 |
| Sodium silico fluoride, $Na_2SiF_6$ | 1.40 |
| Boric acid, $H_3BO_4$ | 1.04 |
| Hydrazine sulfate | 1.12 |

Water to make 1 liter.

Example 15

| | Grams |
|---|---|
| Mercuric bromide, $HgBr_2$ | 5.3 |
| Chromium trioxide, $CrO_3$ | 8.0 |
| Sodium fluoride, NaF | 4.0 |
| Sodium thiosulfate | 4.5 |

Water to make 1 liter.

Example 16

| | Grams |
|---|---|
| Cadmium oxide, CdO | 3.0 |
| Chromium trioxide, $CrO_3$ | 3.4 |
| Sodium silicofluoride, $Na_2SiF_6$ | 2.8 |
| Boric acid, $H_3BO_4$ | 1.5 |
| Hydroquinone | 2.7 |
| Nitric acid (specific gravity 1.42) | 2.1 |

Water to make 1 liter.

Example 17

| | Percent by weight |
|---|---|
| Nickelous fluoride, technical, $NiF_2 \cdot 4H_2O$ | 47.0 |
| Chromium trioxide, $CrO_3$ | 23.5 |
| Boric acid, $H_3BO_4$ | 9.5 |
| Sodium hypophosphite | 20.0 |
| | 100.0 |

17 grams of this mixture is dissolved in water to make 1 liter of solution.

Example 18

| | Grams |
|---|---|
| Cobaltous nitrate, $Co(NO_3)_2 \cdot 6H_2O$ | 8.00 |
| Chromium trioxide, $CrO_3$ | 1.45 |
| Hydrofluoric acid, 48% aqueous solution | 0.80 |
| Potassium ferrocyanide | 2.55 |

Water to make 1 liter.

Example 19

| | Grams |
|---|---|
| Ferric nitrate, $Fe(NO_3)_3 \cdot 9H_2O$ (introduced as a commercial 75% solution) | 24.0 |
| Sodium fluoride, NaF | 1.0 |
| Chromium trioxide, $CrO_3$ | 1.4 |
| Hydrofluoric acid, 48% aqueous solution | 0.83 |
| Phosphorous acid | 7.5 |

Water to make 1 liter.

Example 20

| | Grams |
|---|---|
| Cupric nitrate, $Cu(NO_3)_2 \cdot 3H_2O$ | 6.5 |
| Chromium trioxide, $CrO_3$ | 1.4 |
| Hydrogen fluoride, HF (introduced as aqueous solution) | 0.4 |
| Urea | 2.1 |

Water to make 1 liter.

Example 21

| | Grams |
|---|---|
| Vanadium pentaoxide, $V_2O_5$ | 4.6 |
| Nitric acid, sp. gr. 1.42 | 10.0 |
| Water | 200.0 |
| Chromium trioxide, $CrO_3$ | 1.4 |
| Hydrofluoric acid, 48% aqueous solution | 0.8 |
| Potassium thiocyanate | 4.0 |

Water to make 1 liter.

Colorless conversion coatings are obtainable on aluminum alloys such as 3003, 2024 and 6061, employing the formulations of Examples 14 to 21, which coatings have superior corrosion resistance as measured by exposure to salt spray in the conventional manner. These conversion coatings are bright, uniform, essentially colorless, adherent and resistant to smearing.

While the above described procedure involving incorporation of the color discharge agents in the conversion coating bath itself is preferred and produces best results, I can alternatively treat the colored conversion coating, produced by treatment in the conversion coating baths described above and containing the aforementioned cations, e.g., zinc, nickel and the like, but not containing the color discharge agents, with an aqueous solution of such agents following production of the colored conversion coating.

According to this procedure, after formation of the coating in the conversion coating bath to produce a film normally having a coloration ranging from light yellow thru golden to brown, the article is treated in an aqueous solution of, for example, the above described color discharge agents, thiocyanate, cyanate, thiourea, urea, cyanuric acid or thiocyanuric acid, or the thiosulfates, sulfites, phosphites, hydrazines or hydroquinone. These decolorizing baths may contain from about 0.1 to about 100 grams per liter of solution of such color discharge agents. Concentration of these agents in the solution is preferably from about 0.1% to about 5% by weight of the aqueous solution, but these ranges are not critical. Cold or heated solutions of this type can be employed. Preferably, these solutions should be warm (100–120° F.). The preferred agents in this mode of procedure are thiourea and the thiocyanates, the thiosulfates, sulfites, phosphites, hydrazines or hydroquinone.

I prefer to employ such color discharge agents, according to the invention, which lend themselves readily to convenient processing methods, and perform their function within a time period of about 2 to about 15 minutes at a temperature only moderately above room temperature, preferably between about room temperature and 120° F.

The following are examples of procedure directed to after-treatment of a colored conversion coating with my color discharge agents.

Example 22

A piece of 24S aluminum was dipped in a conversion coating bath formulated as follows for a period of several minutes:

| | Grams |
|---|---|
| $ZnCrO_4 \cdot 7H_2O$ | 4.00 |
| Sodium fluoborate | 1.26 |
| Sodium molybdate | .37 |
| Nitric acid, 40 deg. Bé. | 3.67 |

Water to make one liter.

A deep golden colored film was obtained.

The fresh film is rinsed with water and then dipped in a solution of water containing 4% potassium thiocyanate by weight for several minutes. The coating is then rinsed and dried.

Example 23

The procedure of Example 22 is repeated with other similar pieces of 24S aluminum, but employing an after-treatment of the conversion coating as described above with a 4% thiourea aqueous solution instead of the thiocyanate solution.

In the treatment as above described in Examples 22 and 23, the golden coloration of the film formed by treatment in the conversion coating bath is transformed into a substantially colorless film. Further, the thiocyanate or thiourea treatment enhances the corrosion resistance of the conversion coating even though the coating or film is relatively thin.

Example 24

Similar results as in Examples 22 and 23 are obtainable employing in place of the conversion coating baths of Examples 22 and 23, the following bath:

| | Grams |
|---|---|
| $Hg(NO_3) \cdot H_2O$ | 1.0 |
| $CrO_3$ | 8.0 |
| HF acid (as aqueous solution) | 4.1 |

Water to make 1 liter.

Example 25

The same procedure is followed as in Example 22, except that hydrazine hydrate is substituted for the potassium thiocyanate in effective proportions, e.g. 0.5% hydrazine hydrate, obtaining results similar to Example 22.

Example 26

A formulation consisting of the ingredients listed below was prepared.

| | Percent by weight |
|---|---|
| $ZnSiF_6 \cdot 6H_2O$ | 48.2 |
| $CrO_3$ | 40.0 |
| Boric acid (powder) | 11.8 |
| Total | 100.0 |

The above mixture when kept in closed glass containers remains as a dry, yellow-tan colored, free-flowing powder, the chromium trioxide appearing as small pieces of dark red-brown color.

A processing bath was prepared by adding the above formulation to water in an amount of 1½ ounces per gallon of solution. The bath had a pH of 1.6 without requiring the addition of acid. Panels of 2024 aluminum alloy treated in this solution produced strong, bright yellow conversion films with the bath at about room temperature, within 3 to 5 minutes contact time.

By immersing the resulting coating in a solution of 2% of sodium hypophosphite for about 15 minutes a substantially colorless conversion coating of good corrosion resistance is obtainable.

Example 27

Results similar to those of Example 26 are obtainable employing the following conversion coating bath in place of that of Example 26:

| Ingredients: | Grams |
|---|---|
| CdO | 6.0 |
| $CrO_3$ | 5.4 |
| $Na_2SiF_6$ | 5.5 |
| Urea | 2.5 |
| Boric acid | 0.8 |
| $HNO_3$ (sp. gr. 1.42) | 10.5 |

Example 28

The procedure of Example 22 is repeated employing in place of the conversion coating bath of Example 22, the following bath:

| Ingredients: | Grams |
|---|---|
| Nickel nitrate, $Ni(NO_3)_2 \cdot 6H_2O$ | 8.0 |
| Chromium trioxide, $CrO_3$ | 1.4 |
| Hydrogen fluoride, HF (as aqueous solution) | 0.4 |

Results similar to Example 22 are obtainable.

Example 29

The procedure of Example 22 is followed, employing in place of the conversion coating bath of Example 22, the following bath:

| Ingredients: | Grams |
|---|---|
| Colbaltous nitrate, $Co(NO_3)_2 \cdot 6H_2O$ | 8.0 |
| Chromium trioxide, $CrO_3$ | 1.4 |
| Hydrogen fluoride, HF (as dilute aqueous solution) | 0.4 | and employing as the color discharge agent a 2% solution of hydroquinone in place of potassium thiocyanate. Results similar to Example 22 are obtained.

Example 30

The procedure of Example 22 is repeated, employing in place of the conversion coating bath of Example 22, the following bath:

| Ingredients: | Grams |
|---|---|
| Manganese carbonate, $MnCO_3$ | 4.3 |
| Nitric acid, sp. gr. 1.42 | 5.6 |
| Water | 100.0 |
| (The above ingredients were stirred until all solid was in solution. Then was added the following.) | |
| Chromium trioxide, $CrO_3$ | 1.4 |
| Hydrogen fluoride, HF (as dilute soln.) | 0.4 |

Water to make 1 liter.

and employing a 2% solution of sodium thiosulfate as color discharge agent in place of potassium thiocyanate. Results similar to Example 22 are obtainable.

It will of course be understood that the concentration of my color discharge agents employed in the working solutions, and also the time of treatment of the aluminum article in such baths can vary, depending, for example, upon the particular agent employed, the operating temperature of the solution, the nature and thickness of the conversion coatings formed and the nature of the aluminum article being treated, and especially on the degree of coloration imparted to the coating in the conversion coating bath.

If desired, other materials may be included in the treatment bath, in addition to the color discharge agents described above. Thus, for example, I may incorporate wetting agents, such as an alkyl phenolethylene oxide condensate, or an alkyl aryl sulphonate, e.g. an alkyl benzene sulfonate wherein the alkyl group contains from about 12 to about 18 carbon atoms, in such baths to increase the effectiveness thereof, although these additives are not required.

While the above procedures and solutions of the invention have been mostly described in connection with treatment of the aluminum parts by dipping application in such solutions or baths, the aluminum parts may also be treated by spraying, brushing or swabbing applications of such solutions.

From the foregoing, it is seen that I have developed a process and composition for rendering aluminum conversion coatings substantially colorless, while at the same time enhancing the smear-proofness, uniformity, toughness and corrosion resistance of the coating. The protective coatings of this invention are useful where it is desired to retain the bright, lustrous, colorless appearance of metallic aluminum. Aluminum conversion coatings treated by this process also may be painted, or may be coated with clear organic films, or given other supplementary finishes. It is especially important that the unpainted surfaces have adequate corrosion resistance, and where a paint is to be applied to the surface of the coating, the coated surface should also have adequate adhesive properties to firmly bond with paints and other supplementary finishes. My process produces coatings possessing these qualities.

While I have described particular embodiments of my invention for the purpose of illustration, it should be understood that various modifications and adaptations thereof may be made within the spirit of the invention as set forth in the appended claims.

I claim:

1. A process for producing a substantially colorless chemically bonded coating on an aluminum article which comprises treating said article with an aqueous acid aluminum conversion coating bath, said bath comprising a halogen-containing anion and a cation of the group consisting of zinc, cadmium, mercury, vanadium, chromium, manganese, iron, cobalt, nickel and copper, forming a colored conversion coating on said article, and contacting said colored conversion coating with an agent capable of discharging the color in the conversion film, said color discharge agent reacting chemically with the coloring body present to form a substantially colorless reaction product, and substantially discharging the color from said conversion coating.

2. A process as defined in claim 1, wherein said agent has the linkages represented by the formula

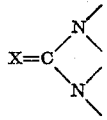

where X is an element of the group consisting of oxygen and sulfur.

3. A process as defined in claim 1, wherein said agent is a compound of the group consisting of a soluble thiocyanate, a soluble cyanate, thiourea, urea, cyanuric acid, thiocyanuric acid, soluble sulfur-containing compounds, soluble phosphorus-containing compounds, soluble ferrocyanides, soluble divalent and trivalent chromium compounds, hydroquinone, quinhydrone and hydrazines.

4. A process as defined in claim 1, wherein said agent is present in said conversion coating bath.

5. A process as defined in claim 1, wherein said colored conversion coating is treated in a separate bath containing said agent.

6. A process for producing a substantially colorless chemically bonded coating on an aluminum article, which comprises treating said article with an aqueous acid aluminum conversion coating bath, said bath comprising a halogen-containing anion, an anion including a member of the group consisting of hexavalent chromium, molybdenum, tungsten and ferricyanide, a cation of the group consisting of zinc, cadmium, mercury, vanadium, chromium, manganese, iron, cobalt, nickel and copper, and an agent of the group consisting of a soluble thiocyanate, a soluble cyanate, thiourea, urea, cyanuric acid, thiocyanuric acid, soluble sulfur-containing compounds, soluble phosphorus-containing compounds, soluble ferrocyanides, soluble divalent and trivalent chromium compounds, hydro-quinone, quinhydrone and hydrazines, and forming a substantially colorless conversion coating of high corrosion resistance, the pH of said solution being about 1.5 to about 3.5.

7. The process as defined in claim 6, wherein said halogen-containing anion is a fluorine-containing anion, and where the amount of said cation is about 0.2 to about 8 grams per liter of solution and the amount of said agent is about 0.1 to about 5 grams per liter of solution.

8. A process for producing a substantially colorless chemically bonded coating on an aluminum article, which comprises treating said article with an aqueous acid aluminum conversion coating bath, said bath comprising a halogen-containing anion, an anion including a member of the group consisting of hexavalent chromium, molybdenum, tungsten and ferricyanide, a cation of the group consisting of zinc, cadmium, mercury, vanadium, chromium, manganese, iron, cobalt, nickel and copper, forming a colored conversion coating on said article, and contacting said colored conversion coating with an aqueous solution of a soluble agent of the group consisting of a soluble thiocyanate, a soluble cyanate, thiourea, urea, cyanuric acid, thiocyanuric acid, soluble sulfur-containing compounds, soluble phosphorus-containing compounds, soluble ferrocyanides, soluble divalent and trivalent chromium compounds, hydroquinone, quinhydrone and hydrazines, and forming a substantially colorless conversion coating of high corrosion resistance, the pH of said solution being about 1.5 to about 3.5, the amount of said agent in said solution being about 1 to about 5 grams per liter of solution.

9. A process as defined in claim 1, wherein said cation is zinc.

10. A process as defined in claim 1, wherein said cation is nickel.

11. A process as defined in claim 1, wherein said cation is cobalt.

12. A process as defined in claim 1, wherein said cation is cadmium.

13. A process as defined in claim 1, wherein said agent is urea.

14. A process as defined in claim 1, wherein said agent is a soluble cyanate.

15. A process as defined in claim 1, wherein said agent is thiourea.

16. A process as defined in claim 1, wherein said agent is a hydrazine.

17. A process as defined in claim 1, wherein said agent is a soluble thiocyanate.

18. A process for producing a substantially colorless chemically bonded coating on an aluminum article, which comprises treating said article with an aqueous acid aluminum conversion coating bath, said bath comprising a fluorine-containing anion, a hexavalent chromium-containing anion, a cation of the group consisting of zinc, cadmium, mercury, vanadium, chromium, manganese, iron, cobalt, nickel and copper, and an agent of the group consisting of a soluble thiocyanate, a soluble cyanate, thiourea, urea, cyanuric acid, thiocyanuric acid, soluble sulfur-containing compounds, soluble phosphorus-containing compounds, soluble ferrocyanides, soluble divalent and trivalent chromium compounds, hydroquinone, quinhydrone and hydrazines, and forming a substantially colorless conversion coating of high corrosion resistance, the amount of hexavalent chromium present being about 0.3 to about 9.0 grams per liter of solution, the ratio of hexavalent chromium to fluorine being about 0.7 : 1 to about 2.5 : 1, the amount of said cation present being about 0.2 to about 8 grams per liter of solution, and the amount of said agent present being about 0.1 to about 5 grams per liter of solution, the pH of said solution being about 2.2 to about 2.8.

19. A process for producing a substantially colorless chemically bonded coating on an aluminum article, which comprises treating said article with an aqueous acid aluminum conversion coating bath having a pH of about 2.2 to about 2.8, said bath comprising a fluorine-containing anion, a hexavalent chromium-containing anion, a cation of the group consisting of zinc, cadmium, mercury, vanadium, chromium, manganese, iron, cobalt, nickel and copper, forming a colored conversion coating on said article, and thereafter contacting said colored conversion coating with a 0.1% to 5% aqueous solution of a soluble agent of the group consisting of a soluble thiocyanate, a soluble cyanate, thiourea, urea, cyanuric acid, thiocyanuric acid, soluble sulfur-containing compounds, soluble phosphorus-containing compounds soluble ferrocyanides, soluble divalent and trivalent chromium compounds, hydroquinone, quinhydrone and hydrazines, the amount of hexavalent chromium present being about 0.3 to about 9.0 grams per liter of solution, the ratio of hexavalent chromium to fluorine being about 0.7 : 1 to about 2.5 : 1, the amount of said cation present being about 0.2 to about 8 grams per liter of solution, and the amount of said agent present being about 0.1 to about 5 grams per liter of solution.

20. The process of claim 19, wherein said agent is urea.

21. The process of claim 19, wherein said agent is a soluble thiocyanate.

22. The process of claim 19, wherein said agent is an alkali metal hypophosphite.

23. An aqueous acid bath for applying a coating to surfaces of objects of aluminum and its alloys, which consists essentially of an effective amount of a halogen-containing anion, an effective amount of an anion including a member of the group consisting of hexavalent chromium, molybdenum, tungsten and ferricyanide, from about 0.2 to about 8 grams per liter of solution of a cation of the group consisting of zinc, cadmium, mercury, vanadium, chromium, manganese, iron, cobalt, nickel and copper, and from about 0.1 to about 5 grams per liter of solution of an agent of the group consisting of a soluble thiocyanate, a soluble cyanate, thiourea, urea, cyanuric acid, thiocyanuric acid, soluble sulfur-containing compounds, soluble phosphorus-containing compounds, soluble ferrocyanides, soluble divalent and trivalent chromium compounds, hydroquinone, quinhydrone and hydrazines, the pH of said solution being about 1.5 to about 3.5.

24. An aqueous bath as defined in claim 23, wherein said halogen-containing anion is a fluorine-containing anion.

25. An aqueous bath as defined in claim 23, wherein said cation is zinc.

26. An aqueous bath as defined in claim 23, wherein said cation is nickel.

27. An aqueous bath as defined in claim 23, wherein said cation is zinc and said agent is urea.

28. An aqueous bath as defined in claim 23, wherein said cation is nickel and said agent is urea.

29. An aqueous acid bath for applying a coating to surfaces of object of aluminum and its alloys which consists essentially of a fluorine-containing anion, a hexavalent chromium-containing anion, a cation of the group consisting of zinc, cadmium, mercury, vanadium, chromium, manganese, iron, cobalt, nickel and copper, and an agent of the group consisting of a soluble thiocyanate, a soluble cyanate, thiourea, urea, cyanuric acid, thiocyanuric acid, soluble sulfur-containing compounds, soluble phosphorus-containing compounds, soluble ferrocyanides, soluble divalent and trivalent chromium compounds, hydroquinone, quinhydrone and hydrazines, the amount of hexavalent chromium present being about 0.3 to about 9.0 grams per liter of solution, the ratio of hexavalent chromium to fluorine being about 0.7:1 to about 2.5:1, the amount of said cation present being about 0.2 to about 8 grams per liter of solution, and the amount of said agent present being about 0.1 to about 5 grams per liter of solution, the pH of said solution being about 2.2 to about 2.8.

30. A solid composition of matter for preparation of baths for producing a chemically bonded coating on an aluminum article, which consists essentially of a mixture of compounds including a halogen, a member of the group consisting of hexavalent chromium, molybdenum, tungsten and ferricyanide, an element of the group consisting of zinc, cadmium, mercury, vanadium, chromium, manganese, iron, cobalt, nickel and copper, and from about 5% to about 25% by weight of said composition of a compound of the group consisting of a soluble thiocyanate, a soluble cyanate, thiourea, urea, cyanuric acid, thiocyanuric acid, soluble sulfur-containing compounds, soluble ferro- cyanides, soluble divalent and trivalent chromium compounds, hydroquinone, quinhydrone and hydrazines.

31. A composition as defined in claim 30, wherein said halogen is fluorine.

32. The composition of claim 31, wherein said element is zinc and said compound is urea.

33. A solid composition of matter for preparation of baths for producing a chemically bonded coating on an aluminum article, which consists essentially of a mixture of compounds including fluorine, hexavalent chromium, an element of the group consisting of zinc, cadminum, mercury, vanadium, chromium, maganese, iron, cobalt, nickel and copper, and from about 5% to about 25% by weight of said composition of a compound of the group consisting of a soluble thiocyanate, a soluble cyanate, thiourea, urea, cyanuric acid, thiocyanuric acid, soluble sulfur-containing compounds, soluble phosphorus-containing compounds, soluble ferrocyanides, soluble divalent and trivalent chromium compounds, hydroquinone, quinhydrone and hydrazines.

34. The composition of claim 33, wherein said element is zinc.

35. The composition of claim 33, wherein said element is nickel.

36. A process for producing a substantially colorless chemically bonded coating on an aluminum article which comprises treating said article with an aqueous acid aluminum conversion coating bath, said bath comprising a fluorine-containing anion, an anion-containing hexavalent chromium, and a member of the group consisting of zinc, cadmium and mercury, forming a colored conversion coating on said article, said conversion coating containing a yellow hexavalent chromium material, and contacting said colored conversion coating with an aqueous solution consisting essentially of a soluble agent capable of discharging the yellow color of said hexavalent chromium material present in the conversion film, said color discharge agent reacting chemically with the hexavalent chromium to form a substantially colorless reaction product, and substantially discharging the color from said conversion coating, the amount of said agent employed being between about 0.1 and about 100 grams per liter of solution, said color discharge agent being one capable of producing a visible discoloration from a colored conversion coating when immersed in a 2% aqueous solution of said agent at a treatment temperature of 120° F. for a period not more than 15 minutes.

37. A process as defined in claim 36, wherein said agent is a member of the group consisting of alkali metal and ammonium ferrocyanides, hypophosphites, and thiosulphates, phosphorous acid, chromic nitrate, hydrazine sulphate and hydroquinone, and the amount of said agent employed is about 0.1 to about 100 grams per liter of solution.

References Cited in the file of this patent

UNITED STATES PATENTS

| 2,796,371 | Ostrander et al. | June 18, 1957 |
| 2,868,679 | Pimbley | Jan. 13, 1959 |
| 2,898,250 | Pimbley | Aug. 4, 1959 |